Patented July 19, 1932

1,868,422

UNITED STATES PATENT OFFICE

FRANK M. G. LUECKE, OF NIXA, MISSOURI

PROCESS FOR CHEESE MANUFACTURE

No Drawing.  Application filed February 24, 1928. Serial No. 256,811.

This invention relates to an improved process for the manufacture of cheese.

One of the important objects of this invention is the provision of an improved process for the manufacture of cheese, by means of which a high grade cheese, uniform in texture and flavor may be obtained, notwithstanding that varying qualities of milk may be used in its manufacture.

A further object of this invention is the provision of an improved process for the manufacture of cheese, including means to provide a quick and efficient coagulation of the milk.

A further object of this invention is the provision of an improved process for treating cheese during the manufacture thereof, including a novel step of steaming the curd during the matting process.

Other objects and advantages of this invention will be apparent during the course of the following detailed description.

In carrying out the process I proceed substantially as follows:

I preferably use raw sweet cow's milk, containing all of the butter fat, and heat the same to a temperature which may vary from 140° F. to 145° F. maintaining the milk under this temperature for a period ranging from 25 to 30 minutes. The milk is then cooled to a temperature approximating 70° F. although it may range from 55° to 90° F., and in this manner pasteurization of the milk is accomplished for the removal of harmful bacteria and germs.

To the thus pasteurized milk is added a starter, preferably consisting of from 2 to 5 per cent lactic acid bacteria; it being preferred to add 3% of this acid, commercially known as "starter". Thereafter twenty cubic centimeters of a twenty-five per cent solution of chemically pure calcium chloride ($CaCl_2$) is added to every one thousand pounds of the pasteurized milk, or in relative proportion thereto. This of course is added to enable the lime constituent, which is liberated or held in suspension after pasteurization, to readily mix with the other ingredients, and expedite coagulation. After the addition of the calcium chloride, the temperature of the milk is maintained at from 88° F. to 90° F. until the acidity of the milk is .25 of 1% to .27 of 1%, although preferably exactly .26 of 1%. At this time four ounces of rennet is added to every one thousand pounds of milk, or in suitable proportion to the amount of milk used, and the coagulation takes place. The calcium chloride of course enables a good coagulation after the rennet is added, so that the curd will have a good texture in the finished product. It will be understood by those skilled in the art, after reading the description, that the calcium chloride makes possible the quick and efficient separation of the curd from the whey, and enables the curd to become firm enough to be properly cooked. The coagulation of the milk requires a period of from twenty to forty minutes.

After coagulation is carried to the desired consistency, the coagulated mass is cut into small portions, preferably cubes, by means of curd knives, and thereafter the whey is permitted to separate from the curd in any approved manner, and both curd and whey are cooked at a temperature ranging from 102° F. to 106° F. although preferably a temperature of exactly 104° F. is maintained. The cooking is carried out over a period of about thirty minutes, and the whey and curd are constantly stirred during this period. When the proper temperature is reached the cooking of the materials is stopped, and they are allowed to stand together from one to two an one-half hours, until the acidity thereof is preferably .19 of 1%, although it may range from .17 of 1% to .21 of 1%. Thereafter the whey is drawn off from the curd.

The next step in the process is that of matting the curd. It is piled from 4" to 6" deep in the vat, and a trench is placed in the center to allow the surplus whey to drain off and the curd knits itself together into a firm plastic mass. Thereafter the compartment of the vat is sealed by placing a cover on the vat in any suitable manner, so as to exclude atmospheric air, and the curd is then steamed with live steam injected into the vat at a temperature of preferably 120° F. although a range of temperatures from 110° F. to 145°

F. may be maintained. The steaming is carried out until the acidity is preferably .45 of 1% reached, although the acidity may range at this point from .35 of 1% to .60 of 1%. The curd is then run through a curd mill, to mill the same and is finally cut, upon leaving the curd, mill into small cubes.

The cooking temperatures of 102° F. to 106° F. above mentioned, are important, because in this step in the process, the curd develops the right body texture and flavor, and the excess whey or moisture is drawn from the curd, leaving the latter firm, mellow, and having a good texture.

The steaming step above mentioned is very important, for thereby the lactic acid is permitted to set up its bacteria action, and develops the necessary acidity in the curd, which is the starting point in the curing process. By the development of the acidity in this manner, the resultant cheese will cure to the desired extent in one month, which otherwise would require a period of a year to accomplish.

After the curd is milled, it is washed in clean pure water having a temperature of about 120° F. but which may have a temperature of from 100° F. to 140° F. The curd is stirred in the water during a period of from ten to twenty minutes, with ordinary curd forks, and when it is thoroughly washed, the water is drained off, and the curd stirred several times to insure complete drainage of all surplus water. Thereafter salt is added to the curd in the proportion of from 2½ pounds to 3½ pounds per 1000 pounds of milk, or in relative proportion thereto. Common table salt is used, and the curd is stirred several times until the salt is completely absorbed.

After the salting operation the curd is piled into the vat again and completely sealed therein from outside air contact, and a second steaming step is carried out, during which the curd is subjected to live steam directly within the vat, at a temperature approximately 115° F. but which may have a range of from 100° F. to 130° F.; the steaming operation being carried out over a period of from 10 to 30 minutes.

Subsequent thereto the curd is placed in moulds of desired size and shape, and subjected to a constant pressure in the mould over a period of from 10 to 12 hours, until the cheese is fully formed, and after which it is removed.

The second steaming step is of course to enhance the curing operation. Live steam is used in both the steam treating steps of the invention, and the steaming steps are important, for thereby a cheese is produced having a good body and texture, without the formation of holes to any appreciable extent, and the curd has a good bond. The final product is waxy and smooth in texture, and of very good flavor.

Various changes in the steps of the method or process, substitution of equivalents, variation in temperatures, and proportion of parts used, may be made to the above described method of manufacturing cheese, without departing from the spirit of the invention or the scope of the claims.

I claim:

1. The process of cheese manufacture which consists in pasteurizing milk, coagulating the milk, separating the curd from the whey, and steaming the curd at a temperature within the range between 110° F. to 145° F. until the desired acidity is attained.

2. The process of cheese manufacture which consists in pasteurizing milk, coagulating the milk, separating the curd from the whey, and steaming the curd in a closed compartment at a temperature within the range between 110° F. to 145° F. until the desired acidity is attained.

3. The process of cheese manufacture which consists in pasteurizing milk, adding calcium chloride to the milk to render the lime salts more soluble, adding a coagulating agent to the milk, separating the curd from the whey, steaming the curd at a temperature within the range between 110° F. to 145° F. to expedite the development of lactic acid bacteria, and treating the curd to produce a cheese product.

4. Those steps in the manufacture of cheese which consists in pasteurizing raw sweet cow's milk, adding lactic acid thereto, coagulating the milk, separating the curd from the whey, and subjecting the curd to a matting treatment including the treatment of the curd with live steam at a temperature within the range between 110° F. to 145° F. to expedite the development of lactic acid therein.

5. The improvement in the art of making cheese from raw milk which consists in producing a curd, drawing off the whey, steam treating the curd at a temperature within the range between 110° F. to 145° F. to expedite the development of lactic acid therein, washing the curd, seasoning the curd, and again steam treating the curd at a temperature within the range between 110° F. to 130° F.

6. The improvement in the art of making cheese which consists in treating pasteurized milk to produce a curd, cooking the curd and whey at a temperature ranging from 102° F. to 106° F. for the removal of excess whey from the curd, steaming the curd at a temperature within the range between 110° F. to 145° F. to expedite the development of lactic acid bacteria, and subsequently treating the curd to produce cheese.

7. The improvement in the art of manufacturing cheese which consists in pasteurizing raw sweet cow's milk with its entire butter fat content, adding a solution of chemically pure calcium chloride (CaCl₂) thereto, treating the milk with rennet to produce coagulation and a curd, separating the curd from the whey, steaming the curd at a temperature within the range between 110° F. to 145° F. to expedite the development of lactic acid bacteria, and subsequently treating the curd to produce cheese.

8. The improvement in the art of making cheese which consists in pasteurizing unskimmed raw sweet cow's milk, adding lactic acid bacteria thereto, adding calcium chloride (CaCl₂) thereto under temperature conditions ranging from 88° F. to 90° F. until the acidity of the milk is from .25 of 1% to .27 of 1%, adding rennet to produce coagulation, separating the curd from the whey and cooking both under temperature conditions of 102° F. to 106° F. for a period approximating 30 minutes while constantly stirring, permitting the curd and whey to stand for a period of time sufficient to produce an acidity in the whey of .17 to 1% to .21 of 1%, drawing the whey from the curd, placing the curd in a confined space and subjecting the same to steam treatment under temperature conditions ranging from 110° F. to 145° F. until the acidity is increased to from substantially .30 of 1% to .60 of 1%, milling the curd, washing the curd, removing all water and moisture from the curd and salting the same, subjecting the curd to a steam treatment under temperature conditions ranging from 100° F. to 130° F. for a period of from 10 to 30 minutes, and subsequently treating the curd to provide a cheese product.

9. The method of manufacturing cheese which consists in pasteurizing unskimmed raw sweet cow's milk, adding from 2 to 5% of lactic acid bacteria thereto, adding in relative proportion 20 cubic centimeters of a 25% solution of chemically pure calcium chloride CaCl₂ to one thousand pounds of milk and maintaining the temperature of the milk at from 88° F. to 90° F. until the acidity thereof ranges from .25 of 1% to .27 of 1%, adding in relative proportion four ounces of rennet to one thousand pounds of milk to coagulate the latter for the formation of a curd, separating the curd from the whey and cooking both together at a temperature ranging from 102° F. to 106° F. over a period of time of about thirty minutes during which it is constantly stirred, holding the curd and whey together for a period of time until the acidity in the whey ranges from .17 of 1% to .21 of 1%, drawing the whey off from the curd, piling the curd for a depth of from four to six inches in a vat and arranging it so that whey may drain from the curd, closing the vat from the atmospheric air and subjecting the curd therein to steam treatment with constant stirring under temperature conditions ranging from 110° F. to 145° F. until the acidity of the curd is raised within a range of from .30 of 1% to .60 of 1%, milling the curd and severing the same into small particles, washing the curd with water ranging in temperature from 100° F. to 145° F. adding salt to the curd in amount of from 2½ pounds to 3½ pounds per one thousand pounds of milk, stirring the curd and salt until the salt is absorbed, placing the curd in a closed container and there subjecting it to live steam treatment under temperatures ranging from 100° F. to 130° F. for a period of from ten to thirty minutes, removing the curd and subjecting it to pressure, and subsequently treating the curd to provide cheese.

10. The process of making cheese which consists in pasteurizing a quantity of raw sweet milk containing all of its butter fat content, adding a starter to ripen the milk, adding calcium chloride to render the lime salts more soluble, maintaining the mixture at a predetermined temperature for a sufficient length of time to permit acidity to develop to a predetermined extent, adding a coagulating agent, permitting the mass to remain at warm temperature for a sufficient length of time to enable acidity to develop to a predetermined extent, subjecting the mass to contact with live steam at a temperature within the range between 110° F. to 145° F. under conditions and a temperature sufficient to increase the acidity of the mass, and suitably segregating, curing and further treating the curd to produce cheese.

11. The improvement in the art of cheese manufacture which consists in pasteurizing raw milk, adding a starting agent thereto, adding an agent for rendering lime salts more soluble, maintaining the milk at a temperature approximating 90° F. until the acidity of the milk is approximately .26 of 1%, adding a coagulating agent to the milk, cooking the curd and whey at a temperature approximating 104° F., subsequently permitting the same to stand until the acidity has reached approximately .19 of 1%, separating the curd from the whey, live steam treating the curd in a sealed compartment at a temperature approximately 120° F. until the acidity of the same approximates .35 of 1%, cutting the curd into cubes, washing and salting the curd, and subsequently enhancing the curing of the curd by subjecting it to live steam treatment in a sealed compartment at substantially a temperature of 115° F.

FRANK M. G. LUECKE.